United States Patent
Patel et al.

(10) Patent No.: US 7,890,625 B2
(45) Date of Patent: Feb. 15, 2011

(54) METHOD AND APPARATUS FOR NETWORK TO RECOMMEND BEST MODE FOR USER COMMUNICATION

(75) Inventors: Alpesh S. Patel, Morrisville, NC (US); John Toebes, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 200 days.

(21) Appl. No.: 12/240,832

(22) Filed: Sep. 29, 2008

(65) Prior Publication Data
US 2010/0082801 A1 Apr. 1, 2010

(51) Int. Cl.
*G06F 15/173* (2006.01)
(52) U.S. Cl. .................. 709/224; 709/223; 709/203
(58) Field of Classification Search ......... 709/223–224, 709/203, 220
See application file for complete search history.

(56) References Cited

U.S. PATENT DOCUMENTS

| | | | |
|---|---|---|---|
| 6,484,130 B2* | 11/2002 | Dwyer et al. | 719/310 |
| 6,665,715 B1* | 12/2003 | Houri | 709/223 |
| 7,299,257 B2* | 11/2007 | Boyer et al. | 709/204 |
| 7,359,938 B1* | 4/2008 | Davies et al. | 709/204 |
| 7,587,482 B2* | 9/2009 | Henderson et al. | 709/223 |
| 2004/0039630 A1* | 2/2004 | Begole et al. | 705/11 |
| 2007/0124296 A1 | 5/2007 | Toebes | |
| 2007/0124297 A1 | 5/2007 | Toebes | |
| 2007/0206741 A1* | 9/2007 | Tiliks et al. | 379/106.02 |
| 2008/0031225 A1* | 2/2008 | Chavda et al. | 370/352 |
| 2009/0181702 A1* | 7/2009 | Vargas et al. | 455/466 |

* cited by examiner

*Primary Examiner*—Philip B Tran
(74) *Attorney, Agent, or Firm*—Patterson & Sheridan, LLP (57) ABSTRACT

The present disclosure generally provides techniques and apparatuses for producing, for an initiating end user, a recommended mode of communication corresponding to a targeted end user in a network environment, based on a plurality of network accessible or determinable inputs. For example, the identity of an initiating end user, the identity of a targeted end user, the current activity of the targeted end user, the communication preferences of the targeted end user, information from available databases, and other available or determinable data may be used by a contact liaison to produce a recommended mode of communication.

17 Claims, 6 Drawing Sheets

METHOD AND APPARATUS FOR NETWORK TO RECOMMEND BEST MODE FOR USER COMMUNICATION

TECHNICAL FIELD

Embodiments of the present disclosure generally relate to network technology.

BACKGROUND

In most organizations there is a frequent need to communicate with others within the organization. When trying to reach a person, the person initiating the communication (an initiating end user) often wants to communicate in a manner (or mode of communication) that has the best probability of reaching the targeted individual. Further, since day-to-day schedules are usually busy and targeted individuals may frequently be in meetings, the initiating end user may want the communication to be minimally intrusive with respect to a targeted end user.

Unfortunately, without intimate knowledge of the day-to-day schedule of the targeted end user, the person initiating the communication may not know the best mode of communication to use in reaching the targeted end user.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of the scope of the present disclosure or claims presented herein.

DESCRIPTION OF EXAMPLE EMBODIMENTS

Overview

Certain embodiments of the present disclosure provide a method for providing a recommended mode of communication for contacting a targeted end user. The method generally includes monitoring network activities of a plurality of end users, determining one or more parameters indicating a state of a targeted end user based on the monitored network activities, selecting at least one recommended mode of communication, from a set of communication modes including at least one mode of communication that utilizes the network, based on the state of the targeted end user as indicated by the parameters, and providing, to a requesting end user, the at least one recommended mode of communication for contacting the targeted end user.

Some embodiments of the present disclosure provide an apparatus providing a recommended mode of communication for contacting a targeted end user. The apparatus generally includes means for means for monitoring network activities of a plurality of end users, means for determining one or more parameters indicating a state of a targeted end user based on the monitored network activities, means for selecting at least one recommended mode of communication, from a set of communication modes including at least one mode of communication that utilizes the network, based on the state of the targeted end user as indicated by the parameters, and means for providing, to a requesting end user, the at least one recommended mode of communication for contacting the targeted end user.

Some embodiments of the present disclosure provide a computer readable medium containing a program which, when executed by a processor, performs operations, for recommending a mode of communication for contacting a targeted end user. The computer readable medium generally stores a program providing operations for monitoring network activities of a plurality of end users, determining one or more parameters indicating a state of a targeted end user based on the monitored network activities, selecting at least one recommended mode of communication, from a set of communication modes including at least one mode of communication that utilizes the network, based on the state of the targeted end user as indicated by the parameters, and providing, to a requesting end user, the at least one recommended mode of communication for contacting the targeted end user.

The present disclosure generally provides techniques and apparatuses for producing, for an initiating end user, a recommendation regarding one or modes of communication through which to contact a targeted end user in a network environment, based on a plurality of network accessible or determinable inputs. For example, the identity of an initiating end user, the identity of a targeted end user, the current activity of the targeted end user, the communication preferences of the targeted end user, information from available databases, and other available or determinable data may be used by a contact liaison to produce a recommended mode of communication.

In most organizations there is a frequent need to communicate with others within the organization. When trying to reach a person, the person initiating the communication (an initiating end user) often wants to communicate in a manner (or mode of communication) that has the best probability of reaching the targeted individual. Further, since day-to-day schedules are usually busy and targeted individuals may frequently be in meetings, the initiating end user may want the communication to be minimally intrusive with respect to a targeted end user.

Accordingly, embodiments of the present disclosure may allow a network to receive a request seeking a recommended mode through which to communicate and to generate a response recommending an appropriate mode of communication based on a number of factors. For example, the recommendation may be based on the initiating end user, the targeted end user, the current activity of the targeted end user, and other available or determinable data resources.

In the following, reference is made to embodiments of the disclosure. However, it should be understood that the present disclosure is not limited to specific described embodiments. Instead, any combination of the following features and elements, whether related to different embodiments or not, is contemplated to implement and practice the techniques presented herein. Furthermore, in various embodiments, the disclosure provides numerous advantages over the prior art. However, although particular embodiments may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

An Exemplary Network Architecture

Figure 1:
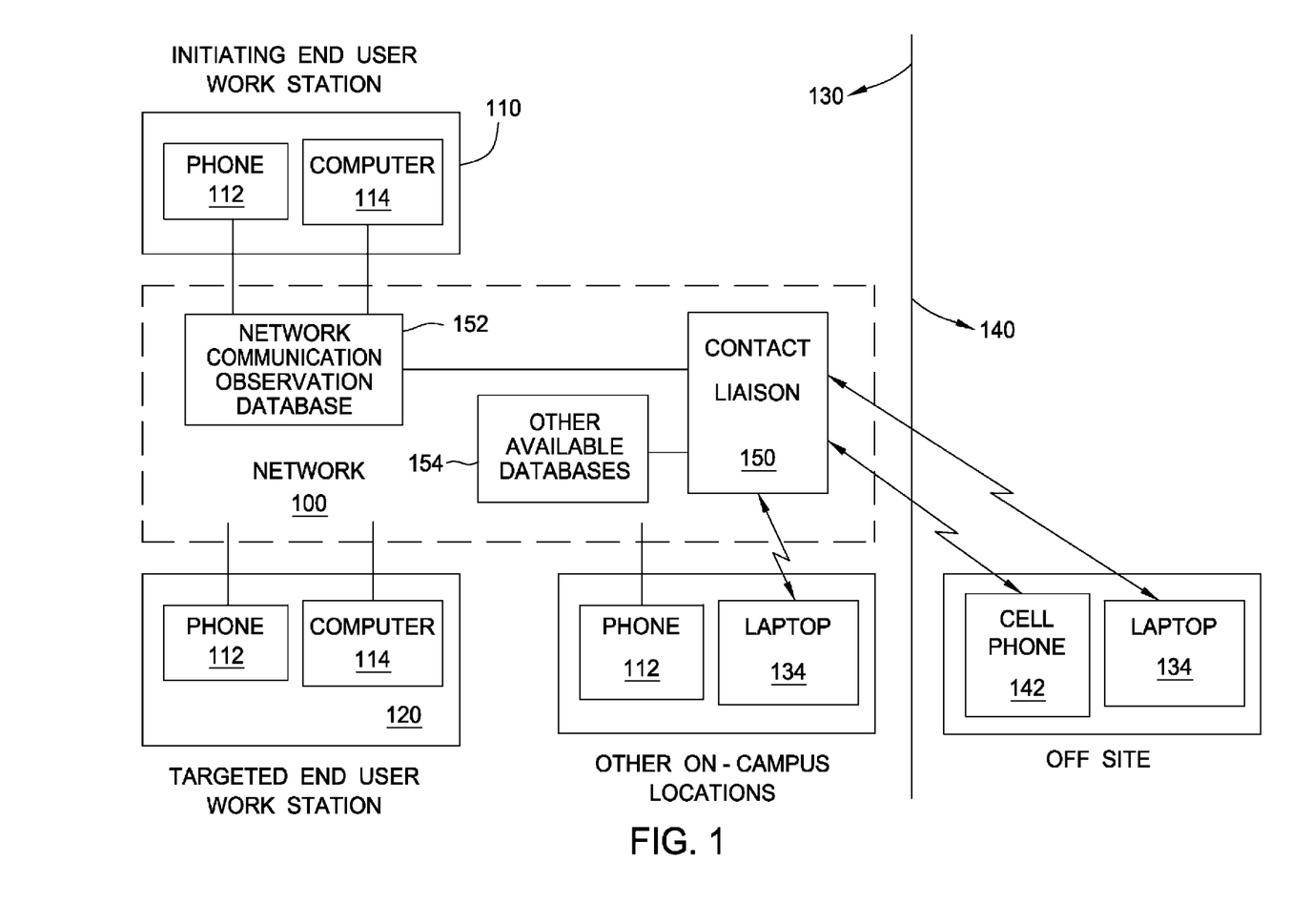
FIG. 1 is a block diagram depicting a network accessed by various modes of communication, in which embodiments of the present disclosure may be utilized.

FIG. 1 is a block diagram depicting a network 100, in which embodiments of the present disclosure may be utilized. As illustrated, the network 100 may contain, among other things, a contact liaison 150 for producing a recommended mode of communication corresponding to a targeted end user in a network environment. The contact liaison 150 may make decisions based on data from a network communication observation database 152, other available databases 154, and other available data resources.

The network 100 may be accessed by a plurality of possible modes of communication depending on the location of an end user and the available hardware. For example, the network may be accessed by a phone 112, desktop computer 114, laptop computer 134, or by any other appropriate device known by those skilled in the art.

In embodiments of the present disclosure, an initiating end user may access the network 100 through an available mode of communication (i.e., a phone 112 or computer 114). In accessing the network, the initiating end user may send a request to the contact liaison 150 seeking a recommendation on the best mode or modes through which to contact a targeted end user. The recommendation generated by the contact liaison may be based on the identity of the initiating end user, the identity of the targeted end user, the location of the targeted end user (e.g., at a work station 120, elsewhere on campus 130, or off site 140), the current activity of the targeted end user, the modes of communication available to the targeted end user (e.g., phone 112, computer 114, laptop, 134, or cell phone 142), as well as other useful data available to or determinable by the contact liaison 150.

Figure 2:
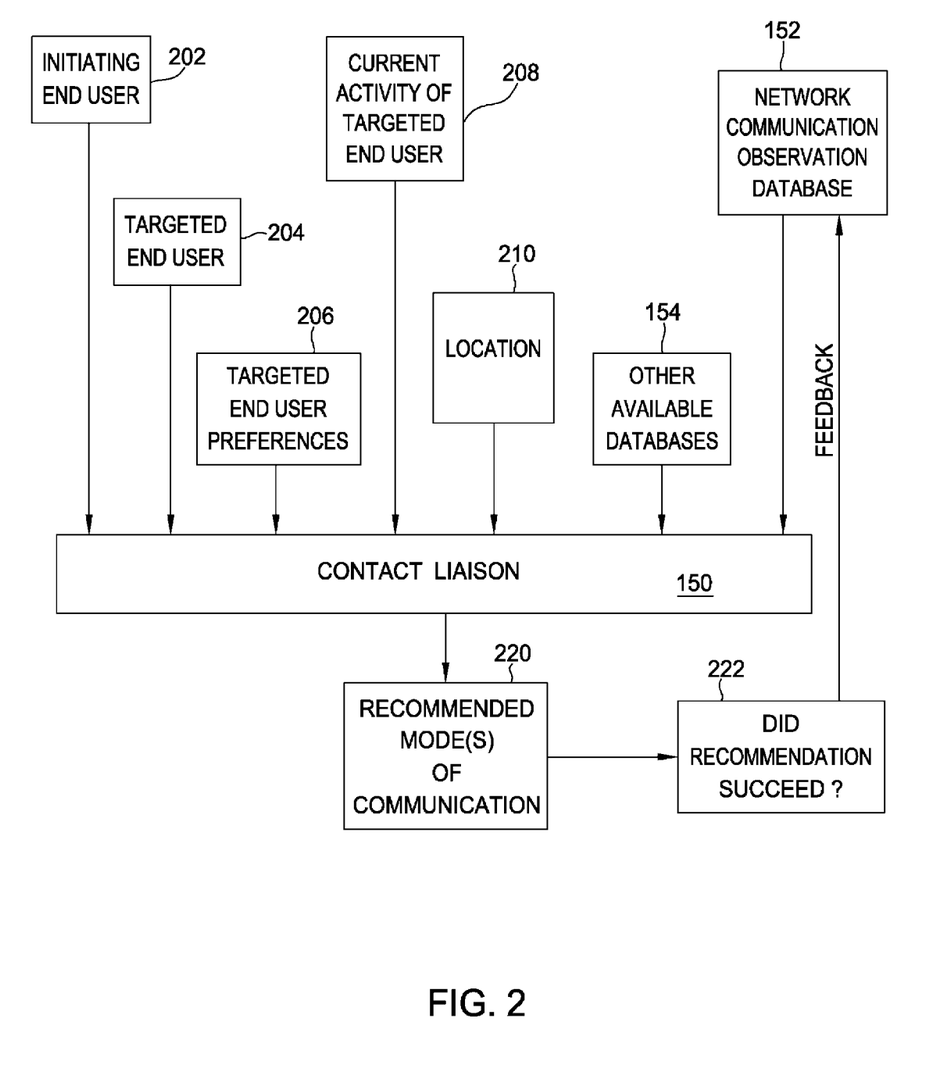
FIG. 2 illustrates elements used in generating a recommended mode of communication, in accordance with embodiments of the present disclosure.

FIG. 2 illustrates the type of elements which may be considered by the contact liaison 150 when generating a recommended mode of communication 220. For example, the identity of the initiating end user 202 and the identity of the targeted end user 204 may be relevant with respect to the availability of certain modes of communication. In a managed network (i.e., a network maintained by a specific organization), the network may determine the identity of the initiating end user 202 or targeted end user 204 by examining an IP address. For example, the network may glean the identity of the end users from the implementation of a Network Admission Control (NAC) application, .1x authentication protocol, or by any other method known to those skilled in the art.

In some instances, one or more modes of communication may not be available to the initiating end user based on the organizational role of the initiating end user and the role of the targeted end user. For example, a test and verification engineer may be prohibited from contacting his manager via the manager's cell phone when the manager is on vacation. Consequently, the recommended mode of communication 220 derived by the contact liaison 150 may vary based on the identity of the initiating end user 202 and the identity of the targeted end user 204. Organizational roles and other relevant data may be obtained from a variety of available databases 154 connected to the network. Any of this data may be considered by the contact liaison 150 in generating a recommended mode of communication 220.

In some embodiments the contact liaison 150 may consider the current activity 208 of the targeted end user and the location of the targeted end user 210 in deriving the recommended mode of communication 220. For example, if the targeted end user is actively connected to the network through a computer 114 at his or her workstation and reading and drafting emails, the contact liaison 150 may recommend communicating with the targeted end user via email before trying to reach the targeted end user with some type of an instant message (commonly referred to as an "IM"), or other type of text message. In contrast, if the targeted end user is connected via an IP associated with a laptop in a conference room, and the volume of traffic exchanged between the user and the network is low, the targeted end user may be in a meeting and the chances of reaching the targeted end user via e-mail may be low. Accordingly, the contact liaison 150 may recommend communicating with the targeted end user via an instant message before trying email.

Additionally, certain embodiments of the present disclosure may enable the definition of restricted zones in which the contact liaison 150 may not recommend certain modes of communication, for example, when the targeted user is in a particular location. For example, if the targeted end user is a surgeon, an operating room or an emergency room may be classified as a restricted zone in which the contact liaison may not recommend instant messaging or email as a recommended mode of communication or may not recommend any type of communication at all.

The contact liaison 150 may be able to determine the location and the current activity of the targeted end user 208 by deep packet inspection performed by network routers, switches, or other network hardware through which data traffic passes. For example, a router may look at the requesting IP address of data packets sent by the targeted end user to determine his or her location. Further, the contact liaison 150 may inversely employ a domain name system (DNS) to determine the domain name associated with the IP address with which web traffic is being exchanged when determining the current activity level of the targeted end user. In short, the network 100 may determine the location and the activity level of the targeted end user 208 based on the requesting IP address, volume of traffic generated, and the specific application that is active.

In determining a targeted end user's activity, the network 100 may observe a variety of communication behaviors. For example, as described above, the network may observe who communicates with whom, how often, the mode of communication between those communicating (e.g., voice over internet protocol (VoIP), instant message, email, etc.), the location of those communicating (e.g., at a workstation, from a conference room, from home via a virtual private network (VPN), etc.), the current activity of the targeted end user at the time of communication (e.g., utilizing video on demand (VoD), emailing co-workers, sending instant messages to friends, etc.), as well as other useful behaviors known by those skilled in the art. The network 100 may store and maintain said observations in the Network Communication Observation Database 152.

Additionally, the network may observe the success of a given mode of communication previously suggested (feedback at 222) with respect to the context (i.e., the targeted end user, the location of the targeted end user, the time of day, the current activity of the targeted end user, identity of initiating end user, etc.) of the previous recommendation. Since these observations may be useful in predicting future responses of the targeted end users, the network may record the observations in a Network Communication Observation Database 152 and utilize the observations when making future recommendations on modes of communication 220.

Moreover, in some embodiments of the present disclosure, the targeted end user may have a means by which to enter personal preferences 206 with respect to recommended modes of communication. For example, the targeted end user may be able to indicate that he or she does not wish to be contacted while on vacation unless it is by his or her manager. The preferences may allow the targeted end user to specify preferred modes of communication, limitations to be applied to certain initiating end user, or limitations to be applied when the targeted end user is at a certain location. For example, a user may be able to specify or define a restricted zone, wherein the contact liaison will recommend only certain modes of communication or no communication at all.

Furthermore, the preferences may allow certain end users to completely opt out such that recommended modes of communication are not generated when he or she is the targeted end user. However, certain embodiments of the present disclosure may provide the ability for an end user to conditionally opt out for a period of time based on user selectable parameters or conditions. For example, a targeted end user may conditionally opt out based on his or her location (e.g., by specifying a restricted zone as described above), the time of day, or any other user selectable parameter known by those skilled in the art. Accordingly, the contact liaison 150 may consider the targeted end user's preferences 206 when deriving the recommended mode of communication 220.

Figure 3:
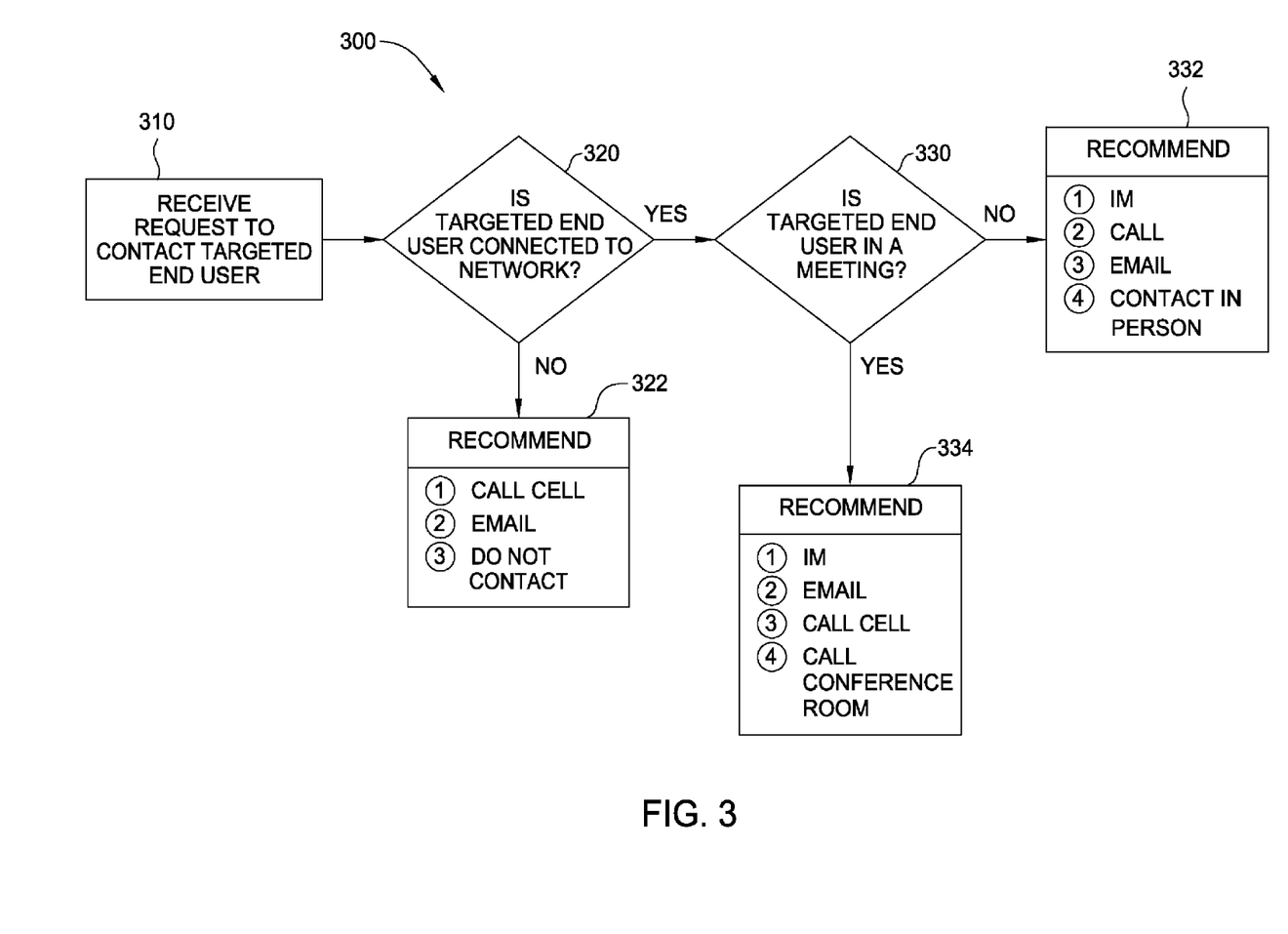
FIG. 3 illustrates example considerations made by a contact liaison in generating a recommended mode of communication, in accordance with embodiments of the present disclosure.

FIG. 3 illustrates example operations 300 which may be used by the contact liaison 150, according to embodiments of the present disclosure. The algorithm begins at 310 with the contact liaison 150 receiving a request over the network 100 for a recommendation for a mode through which to contact a targeted end user. The request may be generated by an application installed on a computer or any other device capable of accessing the network 100 operated by the initiating end user. For example, the initiating end user may launch an application and enter an end user as a target. In response, the contact liaison 150 may generate a recommendation for a mode through which to contact the targeted end user.

In certain embodiments, the contact liaison 150 may proactively generate the recommendation for a communication mode through which to contact the targeted end user in response to the transmission or reception of a communication by the initiating end user (e.g., without receiving an explicit request for a recommendation). For example, an initiating end user may send a targeted end user an instant message or other type of text message. Prior to the delivery of the instant message to the targeted end user, the contact liaison 150 may determine if an instant message is the optimal method of communication. If the contact liaison 150 determines instant messaging is the optimal mode of communication, the instant message may be delivered to the targeted end user. However, if instant messaging is a sub-optimal method of communication (e.g., the targeted end user is actively engaged with an email application) the contact liaison 150 may proactively generate a message for the initiating end user describing the situation and recommending a method of communication with a higher probability of reaching the targeted end user (e.g., contacting the targeted end user via an email).

In generating a recommendation for a mode through which to contact the targeted end user, the contact liaison 150 may determine if the targeted end user is connected to the network 320. If not, the contact liaison may recommend, at 322, calling the targeted end user's cell phone. The contact liaison 150 may recommend this if the targeted end user has his or her preferences set allowing such a recommendation. The contact liaison 150 may also recommend the initiating end user contact the targeted end user via email. The liaison may recommend emailing the targeted end user if the targeted end user regularly travels with a laptop or may check his or her email in a timely manner. However, the contact liaison 150 may recommend to the initiating end user not to contact the targeted end user. The contact liaison 150 may determine that the targeted end user is on vacation, is somewhere in which he or she does not have access to the network (e.g., in a meeting with a Regional Director without a laptop), or is somewhere where a given initiating end user is restricted from contacting the targeted end user (e.g., at home having dinner with his or her family).

If the targeted end user is connected to the network, the contact liaison 150 may further seek to determine if the targeted end user is in a meeting 330. The network may determine if the targeted end user is in a meeting by checking a publically accessible calendar of the targeted end user, determining the location at which the targeted end user is connected to the network, or by any other means known by those skilled in the art.

If the targeted end user is not in a meeting, the contact liaison 150 may observe his or her activity level, location, and other parameters previously mentioned and generate a list of recommended contact modes, as illustrated at 332. Since the targeted end user is not believed to be in a meeting, the contact liaison may give more weight to a mode of communication with a higher probability of success. In some embodiments, the contact liaison 150 may place the recommended contact modes in a list of decreasing priority, such that the initiating end user may see mode most recommended at the top of the list.

However, if the targeted end user is in a meeting, the contact liaison 150 may generate a list based on similar observations but give more weight to modes of communication with a lower intrusive impact on the targeted end user. Consequently, the list of recommended contact modes, listed in decreasing priority, may have a different order when compared to the list of recommended contact modes generated at times when the targeted end user is not in a meeting, as illustrated at 334.

Figure 4A:
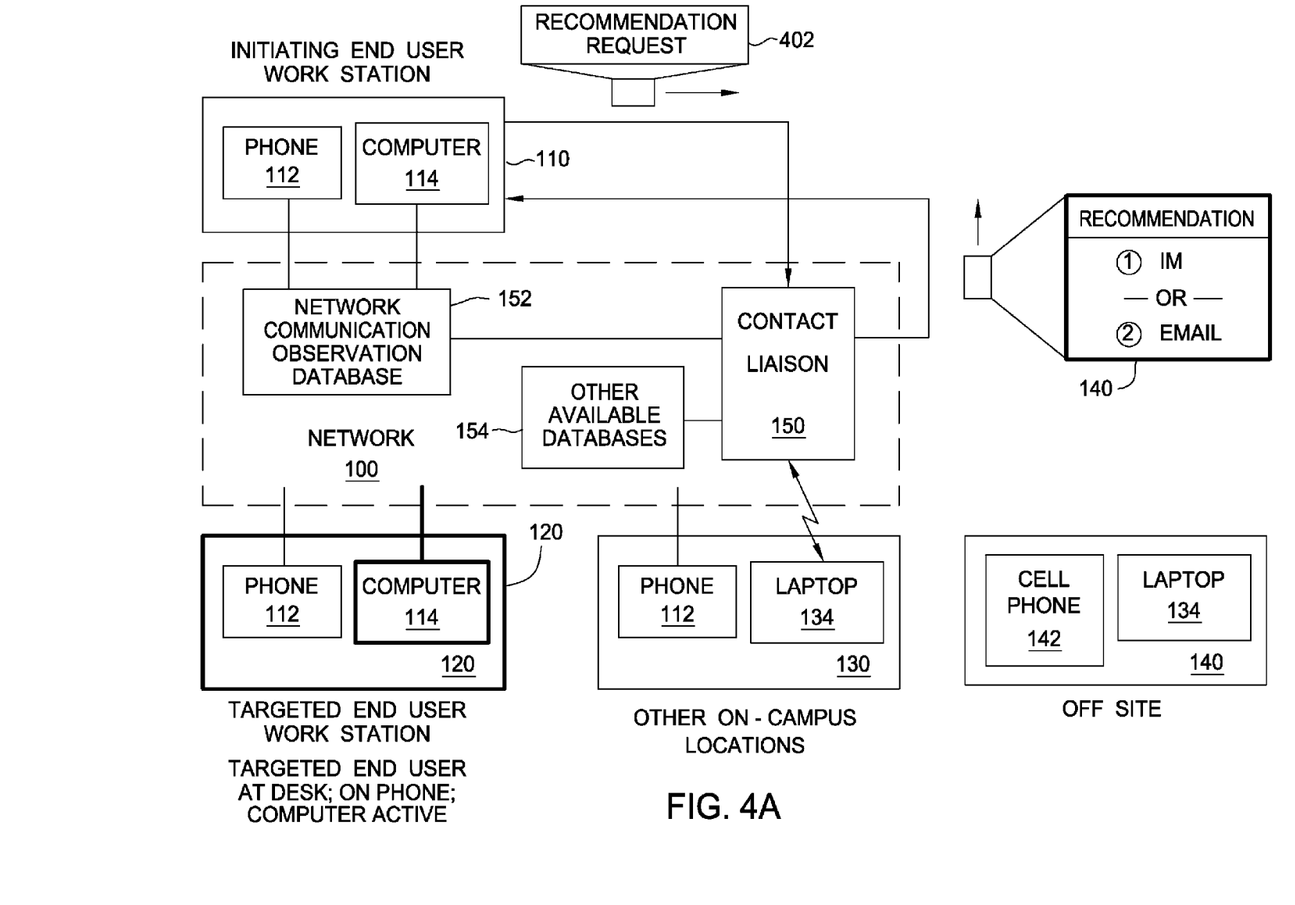
FIGS. 4A-C illustrate examples of different situations in which a targeted end user may be found and the varying recommendations that may be generated as a result, in accordance with embodiments of the present disclosure.
Figure 4B:
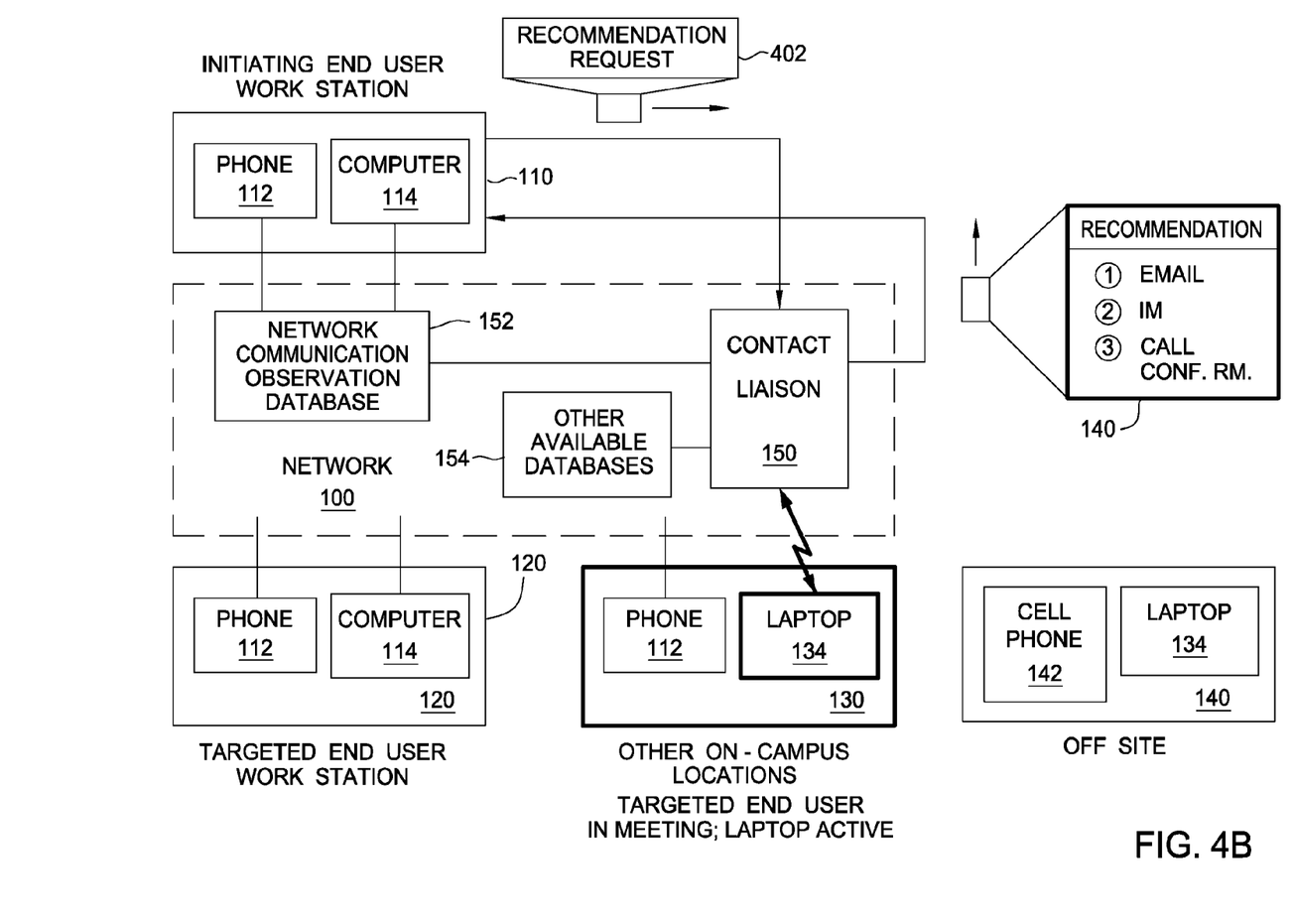
Figure 4C:
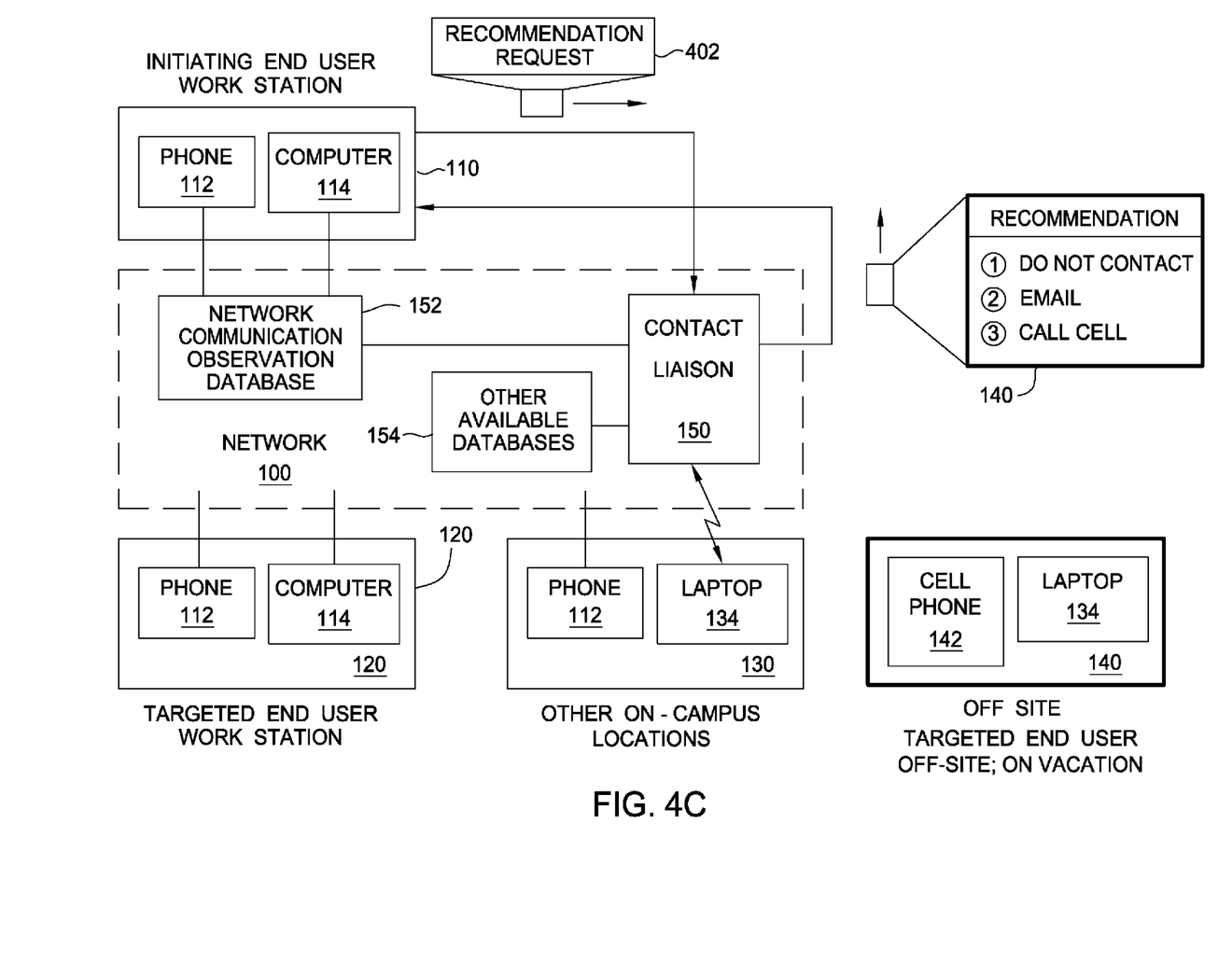

FIGS. 4A-C illustrate examples of different situations in which a targeted end user may be found and the varying recommendations that may be generated as a result. For example, FIG. 4A illustrates a contact liaison 150 receiving a recommendation request 402 and finding the targeted end user at his or her desk, on the phone with the computer actively connected to the network. As a result, the contact liaison 150 may decide against recommending calling the targeted end user because that mode would be too intrusive. Instead, the contact liaison 150 may notice that the computer is active and may determine there is a reasonable probability that the targeted end user would respond to an electronic communication over the computer. Accordingly, the contact liaison 150 may respond with a message 404 recommending the initiating end user first try contacting the targeted end user by sending an instant message because it is quicker and usually pops up on the screen then try contacting the targeted end user via email because the message will remain until the targeted end user acknowledges it.

In contrast, FIG. 4B illustrates the contact liaison 150 receiving a recommendation request 402 and finding the targeted end user in a meeting with a laptop actively connected to the network. Accordingly, the contact liaison 150 may place greater importance on minimizing the intrusive impact on the targeted end user and send a message 404 recommending contacting the targeted end user via email before sending an instant message. However, if the initiating end user happens to be a supervisor of the targeted end user, the contact liaison 150 may also recommend calling the conference room in which the meeting is being held. Though calling the conference room is extremely intrusive, the relationship between the role of the initiating end user and the role of targeted end user may be such as to warrant a very intrusive mode of contact.

In some instances, the contact liaison 150 may receive a recommendation request 402 and find that the targeted end user is off site and on vacation, as illustrated in FIG. 4C. In such instances, the contact liaison 150 may refer to the targeted end user's preferences and give significant consideration to the targeted end user's desire, for example, not to be contacted. As a result, the contact liaison 150 may generate a message 404 recommending the initiating end user not to contact the targeted end user. Instead, the contact liaison 150 may recommend the initiating end user contact an alternate end user.

In some embodiments, the alternate end user suggested by the contact liaison 150 may be selectable by the targeted end user prior to leaving (e.g., similar to an automated "out of office" response provide by email). However, the alternate end user suggested by the contact liaison 150 may also be determined by the contact liaison based on the position of the targeted end user in the organization. For example, the alternate end user suggested by the contact liaison 150 may be the immediate supervisor of the targeted end user.

If, however, the role of the initiating end user is sufficiently important or the targeted end user has made an exception for the initiating end user in his or her preferences, the contact liaison 150 may provide modes of contacting the targeted end user giving priority to less intrusive modes of communication.

While the foregoing is directed to embodiments of the present disclosure, other and further embodiments of the disclosure may be devised without departing from the basic scope thereof, and the scope thereof is determined by the claims that follow. For example, though the foregoing describe embodiments of the present disclosure with respect to methods which may be performed, the various operations of methods described above may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

What is claimed is:

1. A method comprising:
   monitoring network activities of a plurality of end users;
   determining one or more parameters indicating a state of a targeted end user based on the monitored network activities;
   selecting at least one recommended mode of communication, from a set of communication modes including at least one mode of communication that utilizes the network, based on the state of the targeted end user as indicated by the parameters;
   providing, to a requesting end user, the at least one recommended mode of communication for contacting the targeted end user;
   receiving, from the requesting end user, a message destined for the targeted end user via a first mode of communication; and
   proactively providing the at least one recommended mode of communication for contacting the targeted end user, if the first mode of communication does not match the at least one recommended mode of communication.

2. The method of claim 1, wherein determining one or more parameters comprises determining a location of the targeted end user.

3. The method of claim 2, wherein determining the location of the targeted end user comprises:
   determining the location of the targeted end user based on an IP address of one or more data packets sent by the targeted end user.

4. The method of claim 1, wherein determining one or more parameters indicating a state of a targeted end user comprises:
   determining one or more user preferences, specified by the targeted end user, regarding recommended modes of communication.

5. The method of claim 4, wherein the user preferences comprise at least one of:
   limitations on one or more recommended modes of communication based on a time of day; and
   limitations on one or more recommended modes of communication based on a presence of the targeted end user in a restricted zone.

6. The method of claim 1, wherein determining one or more parameters comprises determining a current activity of the targeted end user.

7. The method of claim 6, wherein determining the current activity of the targeted end user comprises:
   receiving a destination IP address of one or more data packets sent by the targeted end user;
   determining a domain name associated with the IP address with which the targeted end user is exchanging data; and
   determining an active application based on the domain name of the IP address with which the targeted end user is exchanging data.

8. The method of claim 1, wherein selecting at least one recommended mode of communication comprises:
   evaluating a subset of the monitored network activities, stored in a network communication observation database, in light of the parameters; and
   selecting at least one recommended mode of communication from the set of communication modes with a high probability of contacting the targeted end user based, at least in part, on the evaluation of the subset of the monitored network activities and the parameters.

9. The method of claim 1 further comprising:
   receiving a request for a recommended mode of communication for contacting the targeted end user from the requesting end user.

10. An apparatus comprising:
    means for monitoring network activities of a plurality of end users;
    means for determining one or more parameters indicating a state of a targeted end user based on the monitored network activities;
    means for selecting at least one recommended mode of communication, from a set of communication modes including at least one mode of communication that utilizes the network, based on the state of the targeted end user as indicated by the parameters;

means for providing, to a requesting end user, the at least one recommended mode of communication for contacting the targeted end user;

means for receiving, from the requesting end user, a message destined for the targeted end user via a first mode of communication; and wherein the means for providing, to a requesting end user, the at least one recommended mode of communication for contacting the targeted end user is configured to proactively provide the at least one recommended mode of communication for contacting the targeted end user, if the first mode of communication does not match the at least one recommended mode of communication.

11. The apparatus of claim 10, wherein the means for determining one or more parameters is configured to determine a location of the targeted end user.

12. The apparatus of claim 11, wherein the means for determining the location of the targeted end user is configured to determine the location of the targeted end user based on an IP address of one or more data packets sent by the targeted end user.

13. The apparatus of claim 10 further comprising:
means for receiving a request for a recommended mode of communication for contacting the targeted end user from the requesting end user.

14. A non-transitory computer readable medium storage containing a program which, when executed by a processor, performs operations, comprising:
monitoring network activities of a plurality of end users;
determining one or more parameters indicating a state of a targeted end user based on the monitored network activities;
selecting at least one recommended mode of communication, from a set of communication modes including at least one mode of communication that utilizes the network, based on the state of the targeted end user as indicated by the parameters;
providing, to a requesting end user, the at least one recommended mode of communication for contacting the targeted end user;
receiving, from the requesting end user, a message destined for the targeted end user via a first mode of communication; and
wherein providing, to a requesting end user, the at least one recommended mode of communication for contacting the targeted end user comprises proactively providing the at least one recommended mode of communication for contacting the targeted end user, if the first mode of communication does not match the at least one recommended mode of communication.

15. The non-transitory computer readable storage medium of claim 14, wherein determining one or more parameters comprises determining a location of the targeted end user.

16. The non-transitory computer readable storage medium of claim 15, wherein determining the location of the targeted end user comprises:
determining the location of the targeted end user based on an IP address of one or more data packets sent by the targeted end user.

17. The non-transitory computer readable storage medium of claim 14, wherein the operations further comprise:
receiving a request for a recommended mode of communication for contacting the targeted end user from the requesting end user.

* * * * *